US008395083B2

(12) United States Patent
Naveh et al.

(10) Patent No.: US 8,395,083 B2
(45) Date of Patent: Mar. 12, 2013

(54) MULTIPLE BEAM DRILLING SYSTEM

(75) Inventors: Benny Naveh, Givat Shmuel (IL); Zvi Kotler, Tel Aviv (IL); Hanina Golan, Rishon Lezion (IL)

(73) Assignee: Orbotech Ltd., Yavne (IL)

( * ) Notice: Subject to any disclaimer, the term of this patent is extended or adjusted under 35 U.S.C. 154(b) by 286 days.

(21) Appl. No.: 12/812,073

(22) PCT Filed: Jan. 11, 2009

(86) PCT No.: PCT/IL2009/000042
§ 371 (c)(1),
(2), (4) Date: Jul. 8, 2010

(87) PCT Pub. No.: WO2009/087639
PCT Pub. Date: Jul. 16, 2009

(65) Prior Publication Data
US 2010/0282726 A1  Nov. 11, 2010

Related U.S. Application Data

(60) Provisional application No. 61/020,273, filed on Jan. 10, 2008.

(51) Int. Cl.
*B23K 26/00* (2006.01)

(52) U.S. Cl. .......... 219/121.71; 219/121.68; 219/121.72

(58) Field of Classification Search ............. 219/121.71, 219/121.67, 121.68, 121.69, 121.72
See application file for complete search history.

(56) References Cited

U.S. PATENT DOCUMENTS

| | | |
|---|---|---|
| 6,809,290 B2 | 10/2004 | Gross et al. |
| 7,078,650 B2 | 7/2006 | Gross et al. |
| 7,176,409 B2 | 2/2007 | Gross et al. |
| 7,206,120 B2 | 4/2007 | Gross et al. |
| 2004/0206734 A1 | 10/2004 | Horsting |

OTHER PUBLICATIONS

International Search Report PCT/IL2009/000042 dated May 14, 2009.

*Primary Examiner* — Kevin M Picardat
(74) *Attorney, Agent, or Firm* — Sughrue Mion, PLLC (57) ABSTRACT

A method for laser drilling of holes in a substrate (44) with varying simultaneity including operating a laser (22) to produce a single output beam (24) whose pulses have a total energy, dividing the single output beam into plural beams (41) to an extent which varies over time and applying the plural beams to plural hole drilling locations (209, 210, 212, 214, 216, 218, 220, 222) on the substrate including simultaneously drilling first parts of multiple holes using corresponding ones of the plural beams having a pulse energy which is a first fraction of the total energy and thereafter drilling at least one second part of at least one of the multiple holes using at least one of the plural beams each having a pulse energy which is at least a second fraction of the total energy, the second fraction being different from the first fraction.

11 Claims, 7 Drawing Sheets

MULTIPLE BEAM DRILLING SYSTEM

CROSS-REFERENCE TO RELATED APPLICATIONS

Reference is made to U.S. Provisional Patent Application Ser. No. 61/020,273, filed Jan. 10, 2008 and entitled Multiple Laser Beam Positioning and Energy Delivery System, the disclosure of which is hereby incorporated by reference and priority of which is hereby claimed pursuant to 37 CFR 1.78 (a) (4) and (5)(i).

This application is related to the PCT Patent Application titled "Multiple Mirror Calibration System," filed on even date, which is assigned to the assignee of the present invention and which is also incorporated herein by reference.

FIELD OF THE INVENTION

The present invention relates generally to drilling apparatus, and specifically to drilling of multiple holes using a laser beam.

BACKGROUND OF THE INVENTION

For a number of years laser beams have been used in fabrication systems, operating on an object such as a substrate, for such purposes as drilling, fusion, or ablation of the object. In order to reduce the time of fabrication, the systems may use multiple laser beams. However, there is a need to improve the flexibility of operation of known systems that use multiple beams for drilling.

SUMMARY OF THE INVENTION

The present invention provides an improved system and method for laser drilling of holes in a substrate with varying simultaneity.

There is thus provided in accordance with a preferred embodiment of the present invention a method for laser drilling of holes in a substrate with varying simultaneity including operating a laser to produce a single output beam whose pulses have a total energy, dividing the single output beam into plural beams to an extent which varies over time and applying the plural beams to plural hole drilling locations on the substrate including simultaneously drilling first parts of multiple holes using corresponding ones of the plural beams having a pulse energy which is a first fraction of the total energy and thereafter drilling at least one second part of at least one of the multiple holes using at least one of the plural beams each having a pulse energy which is at least a second fraction of the total energy, the second fraction being different from the first fraction.

In accordance with a preferred embodiment of the present invention the first fraction is a function of the number of the multiple holes.

In accordance with a preferred embodiment of the present invention the second fraction is a function of the number of the multiple holes having the at least one second part being drilled.

There is also provided in accordance with a preferred embodiment of the present invention a method for laser drilling of holes in a substrate with varying simultaneity including operating a laser to produce a single output beam having a total power, dividing the single output beam into plural beams to an extent which varies over time and applying the plural beams to plural hole drilling locations on the substrate including simultaneously drilling first parts of multiple holes using corresponding ones of the plural beams having a beam power which is a first fraction of the total power and thereafter drilling at least one second part of at least one of the multiple holes using at least one of the plural beams each having a beam power which is at least a second fraction of the total power, the second fraction being different from the first fraction.

In accordance with a preferred embodiment of the present invention the first fraction is a function of the number of the multiple holes.

In accordance with a preferred embodiment of the present invention the second fraction is a function of the number of the multiple holes having the at least one second part being drilled.

Preferably, the single output beam includes pulses having single beam pulse energies generated at a pulse repetition rate and the ones of the plural beams drilling first parts of multiple holes include pulses having the pulse repetition rate and pulse energies which are the first fraction of the single beam pulse energies. Additionally, the at least one of the plural beams drilling at least one second part of at least one of the multiple holes include pulses having the pulse repetition rate and pulse energies which are at least the second fraction of the single beam pulse energies. Alternatively, the at least one of the plural beams drilling at least one second part of at least one of the multiple holes include pulses having a sub-multiple of the pulse repetition rate and pulse energies which are a function of the single beam pulse energies, wherein the sub-multiple and the function are selected in response to the second fraction.

In accordance with a preferred embodiment of the present invention the single output beam includes pulses having single beam pulse energies generated at a pulse repetition rate and the ones of the plural beams drilling first parts of multiple holes include pulses having a first sub-multiple of the pulse repetition rate selected in response to the first fraction and pulse energies which are a first function of the single beam pulse energies. Additionally, the at least one of the plural beams drilling at least one second part of at least one of the multiple holes include pulses having a second sub-multiple of the pulse repetition rate and pulse energies which are a second function of the single beam pulse energies, the second sub-multiple and the second function being selected in response to the second fraction.

BRIEF DESCRIPTION OF THE DRAWINGS

The present invention will be more fully understood from the following detailed description of the embodiments thereof, taken together with the drawings, a brief description of which follows.

FIGS. 3A-3I are simplified schematic illustrations of different stages in a time progression of drilling a first substrate, according to an embodiment of the present invention;

FIGS. 4A-4I are simplified schematic illustrations of different stages in a time progression of drilling a second substrate, according to an embodiment of the present invention.

DETAILED DESCRIPTION OF EMBODIMENTS

Figure 1:
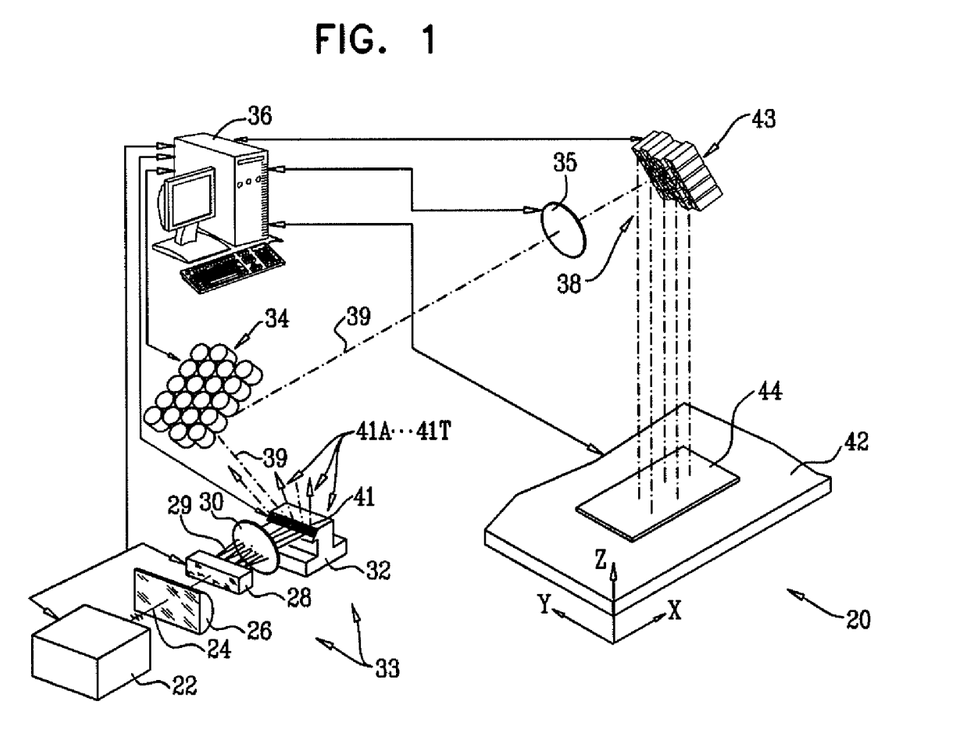
FIG. 1 is a schematic simplified diagram of a multiple drilling apparatus, according to an embodiment of the present invention.

Reference is now made to FIG. 1, which is a schematic diagram of a multiple drilling apparatus 20, according to an embodiment of the present invention. Apparatus 20 is under the overall control of a processing unit 36, which is typically operated by a human controller of the apparatus.

Processing unit 36 typically comprises a general-purpose computer processor, which is programmed in software to carry out functions that are described herein. The software may be downloaded to the processor in electronic form, over a network, for example. Alternatively or additionally, the software may be provided on tangible media, such as optical, magnetic, or electronic storage media. Further alternatively, at least some of the functions of the processor may be carried out by dedicated or programmable hardware.

Apparatus 20 comprises a set of selectably directable mirrors 38, the orientation of each of the directable mirrors being individually controlled by commands or instructions generated by processing unit 36. The directable mirrors are also herein termed orientable mirrors and act as steering mirrors for beams which impinge upon them. Apparatus 20 may be used as a laser drilling facility, wherein the multiple orientable mirrors are used to direct respective laser sub-beams to drill multiple holes in a substrate 44, which may be a single-layered or a multi-layered substrate, mounted on a movable table 42, in a production phase of the apparatus. In addition to drilling, it will be understood that in the production phase the facility may be used for operations similar to drilling, such as ablation and/or machining of material. In the description hereinbelow, different substrates 44 are distinguished as necessary by appending a different letter to the identifying numeral 44. Table 42 may move, according to commands received from processing unit 36, in orthogonal x, y, and z directions.

Apparatus 20 comprises a laser 22, which is typically a solid-state laser generating a single beam 24 of pulses at an ultra-violet wavelength. The parameters of the beam, including its overall energy, are set according to instructions received from processing unit 36. In the following description, it is assumed, by way of example, that laser 22 generates the pulses of single beam 24 at a fixed repetition rate F Hz, that each pulse has a total energy $E_t$ J, so that the beam has an average power of $P = E_t \cdot F$ W. In one embodiment of the present invention, the pulses of the beam have a width of approximately 30 ns. The pulses are produced at a fixed repetition rate $F \approx 100$ kHz, each pulse having a total energy $E_t \approx 100$ µJ, so that an average power of the beam is $P \approx 10$ W. Typically, approximately the full energy of the laser pulses is used in the production phase.

Beam 24 passes through a cylindrical lens 26, which focuses the beam to a substantially collimated beam that is transmitted to an acousto-optic deflector (AOD) 28. AOD 28 receives radio-frequency (RF) driving input from processing unit 36, the RF input causing the incident collimated laser beam to be diffracted into one or more sub-beams 29. Sub-beams 29 are typically generated to be in a two-dimensional plane. Processing unit 36 may select the number of the sub-beams, and the distribution of energy between the sub-beams, by varying parameters of the RF input into AOD 28. An AOD which may be used in embodiments of the present invention is the part MQ180-A0,2-UV produced by AA Optoelectronic of Saint-Rémy-Lès-Chevreuse, France.

To generate the one or more sub-beams 29, processing unit 36 may operate AOD 28 in a number of different modes, the different modes forming the sub-beams to have different characteristics. The different modes of operation, and different possible characteristics of generated sub-beams 29, are described in more detail with respect to FIGS. 2A, 2B, and 2C, below.

Sub-beams 29 are transferred by a relay lens 30 to a first set of mirrors 32. Mirrors 32 are oriented to reflect their respective incident beams, as a three-dimensional set of sub-beams 41, to a second set of mirrors 34. For clarity, in FIG. 1 only a path 39 of one of the three-dimensional set of sub-beams is shown. In the following description, each sub-beam of set 41 is distinguished, as required, by a letter suffix. Thus, if, as illustrated in FIG. 1, there are twenty mirrors 34 and twenty mirrors 38, then set 41 comprises twenty sub-beams 41A, 41B, ..., 41T. As appropriate, in the following description, the corresponding letter is also appended to elements requiring differentiation. For example, sub-beam 41B is initially generated from sub-beam 29B. Sub-beam 41B is then reflected in turn by mirrors 32B and 34B, and finally by an orientable mirror 38B. Mirrors 32 and 34 are typically fixed in position and orientation, and are configured so that the three-dimensional set of sub-beams reflected from mirrors 34 are generally parallel to each other.

The three-dimensional set of sub-beams reflected from mirrors 34 is transmitted to orientable mirrors 38. Between mirrors 32, mirrors 34, and mirrors 38 are beam conditioning and relay optics, illustrated schematically for purposes of clarity in FIG. 1 by a lens 35. The beam conditioning and relay optics ensure that the sub-beams reflected by mirrors 38 are collimated and narrow. The optics are controlled by processing unit 36 to generate, as required, the sub-beams to have different diameters. In the following description, the elements of apparatus 20 generating set 41 of sub-beams, i.e. elements 22, 26, 28, 30, 32, 34, and 35, are also referred to herein as a sub-beam generating system 33.

Each mirror of set 38 is coupled to a respective steering assembly, herein termed an adjustable mount 43, in a set of mounts. Each mount 43 of the set is individually controlled by processing unit 36, which is able to direct the orientation of a specific mount, and thus the orientation of the mirror coupled to the mount, within limits according to characteristics of the mount. The mounts and their coupled mirrors are configured so that the reflected sub-beams from the mirrors are approximately orthogonal to the surface of movable table 42. Typically, mounts 43 use galvanometric elements, to which are attached mirrors 38, to implement two-axis mirror steering.

Figure 2A:
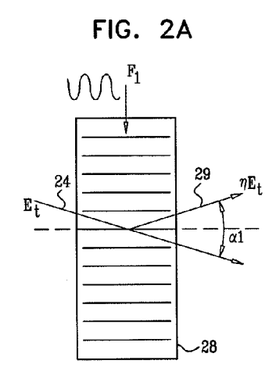
FIGS. 2A, 2B, and 2C are simplified schematic diagrams illustrating different modes of operation of an acousto-optic deflector, according to an embodiment of the present invention.
Figure 2B:
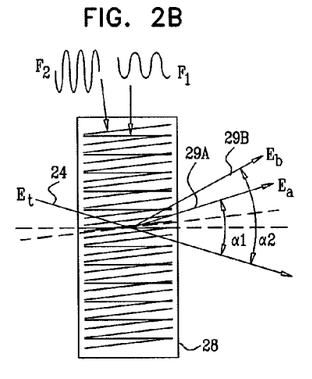
Figure 2C:
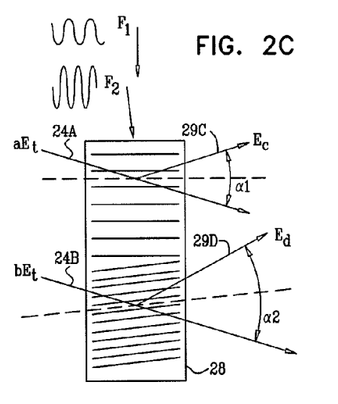

FIGS. 2A, 2B, and 2C are schematic diagrams illustrating three different modes of operation of AOD 28, according to an embodiment of the present invention. The first two modes may be implemented by an AOD such as the AOD exemplified above produced by AA Optoelectronic. In all modes, the incoming laser beam, the direction of the travelling acoustic wave in the AOD, and the one or more sub-beams generated by the wave, are in a single plane.

In a first mode, illustrated in FIG. 2A, processing unit 36 generates an RF signal having an amplitude A1 and a frequency F1. The RF signal forms an acoustic wave, and the acoustic wave causes AOD 28 to act as a diffraction grating having a single pitch. The grating deflects incoming laser beam 24 from lens 26 (FIG. 1) by an angle $\alpha 1$, so forming a single sub-beam 29. Processing unit 36 may vary the angle $\alpha 1$ by varying the value of frequency F1. The energy of the pulses in the sub-beam may be varied by varying the amplitude A1.

In the first mode the AOD typically operates with a beam transfer efficiency ($\eta$) of up to approximately 90%, so that by varying the value of A1 the energy of the pulses of the single sub-beam is $E=\eta E_t$, where $E_t$ is the pulse energy of beam 24, and $\eta \leq 0.9$. The rest of the energy is undeflected pulse energy and low efficiency higher harmonics. The undeflected pulse energy is typically absorbed by a beam dump. The repetition rate of the pulses of the single sub-beam is the same as that of the pulses of beam 24, and the average power of the sub-beam is $\eta P$, where P is the average power of beam 24.

In a second mode, illustrated in FIG. 2B, processing unit 36 generates a combined RF signal having two or more different frequencies F1, F2, . . . . A paper by D. L. Hecht, entitled "Multifrequency acoustooptic diffraction", published in IEEE Trans. Sonics Ultrasonics SU-24(1), 7-18(1977), describes the operation of the second mode.

For simplicity in FIG. 2B, only the effects of two different frequencies are shown. Processing unit 36 generates each of the frequencies to have a respective amplitude A1, A2, . . . . Processing unit 36 generates the different frequencies of the RF signal so as to cause AOD 28 to act effectively as a multi-pitched diffraction grating, the RF input causing an acoustic wave to travel in the AOD. In this case incoming laser beam 24 is divided into a number of sub-beams 29A, 29B, . . . corresponding to the number of different frequencies F1, F2, . . . . The angles $\alpha 1, \alpha 2, \ldots$ of each of the sub-beams are respectively dependent on the frequencies F1, F2, . . . .

The energies of the pulses of each sub-beam, $E_a$, $E_b$, may be written: $E_a=\eta_a E_t$, $E_b=\eta_b E_t$, where $\eta_a<1$ and $\eta_b<1$. The characteristics of the AOD typically allow the total pulse energy of the exiting beams to be no more than about 70%, so that in the example described herein $E_a+E_b \leq 0.7\ E_t$. Within this overall constraint, processing unit 36 may vary the pulse energy of each of the sub-beams by varying the values of the amplitude of the respective RF frequency, in the example herein A1 and A2. As for the first mode, any undeflected energy may be absorbed by a beam dump. The pulse repetition rate of exiting sub-beams is the same as that of the incoming beam, and for an incoming beam having average power P, the average power of each sub-beam is given by $P_a=\eta_a P$, $P_b=\eta_b P$.

In a third mode, illustrated in FIG. 2C, processing unit 36 generates an RF signal that effectively divides AOD 28 into two or more gratings having different pitches. In order to implement the third mode, the operating window of the AOD needs to be extended from the value that is typically available in "off-the-shelf" acousto-optic deflectors, such as the AOD exemplified above. The extension allows different gratings to be formed in the AOD in a "side-by-side" manner. Those having ordinary skill in the art will be able to define the amount of the extension, and the requirements for producing the extension, without undue experimentation.

For simplicity in the following explanation of the third mode, AOD 28 is assumed to be effectively divided into two gratings. The RF signal for the third mode has two component frequencies F1, F2, each component frequency having a respective amplitude A1, A2. In contrast to the RF input for the second mode, the RF input for the third mode alternates the different component frequencies, rather than combining them as in the second mode.

In the third mode, a beamsplitter (not shown in FIG. 2C) before AOD 28 splits incoming beam 24 into two beams 24A and 24B. The beamsplitter is typically an optical beamsplitter, which may have any convenient ratio of splitting, such as 50:50. Alternatively, another AOD that typically is configured to operate in the second mode, described above may be used as a beamsplitter. If beam 24 has a pulse energy $E_t$, beams 24A and 24B have respective pulse energies $aE_t$ and $bE_t$, where a,b<1 and the values of a and b are characteristic of the beamsplitter.

Each beam 24A, 24B is deflected by a different grating, according to the pitch of the grating, as described above for the first mode. The resulting sub-beams 29C, 29D, generated by the third mode of operation have respective pulse energies $E_c$, $E_d$, given by $E_c=a\eta_a E_t$, $E_d=b\eta_b E_t$, where $\eta_a<1$ and $\eta_b<1$. As for the first mode, $\eta_a$ and $\eta_b$ may be varied by respectively varying the values of A1 and A2, and typically have values up to about 0.9. The average powers of the sub-beams, for an input average beam power P, are given by $P_c=a\eta_a P$, $P_d=b\eta_b P$.

As for the first and second modes, any undeflected energy in the third mode may be absorbed by a beam dump.

In the description of the three modes of operation of AOD 28 above, the sub-beams output from AOD 28 have the same pulse repetition rate, i.e., the same frequency, as input beam 24. However, this is not a necessary requirement, and in some embodiments of the present invention, processing unit 36 adjusts the RF input to the AOD so that the frequency of the sub-beams output is a sub-multiple of the input frequency. For example, in the system illustrated by FIG. 2A, processing unit 36 may alternate the frequency input to AOD 28 between F1 and F2, according to the pulse repetition rate of beam 24. This toggles the diversion of pulses from beam 24 between angle $\alpha 1$ and angle $\alpha 2$, so that the pulses output in each of the sub-beams have a frequency which is half that of the pulses of beam 24.

In this case, the pulse energies may be approximately the same as the incoming pulse energies. However, because of the reduced repetition rate of the pulses in the sub-beams, the average sub-beam power is significantly different from the average incoming beam power. For example, if the incoming beam has pulse energies of $E_t$ and average power P, and the values of A1 and A2 are set so that the pulses of each sub-beam have equal energies $\eta E_t$, the sub-beams have average power, $$\frac{\eta P}{2}$$

because of the halved repletion rate of the pulses.

Having the ability to set the pulse rate of the sub-beams to be a sub-multiple of the pulse rate of the incoming beam provides extra flexibility in drilling a given material. Since the pulse energy is typically the parameter that most governs the effect on the material, reducing the average power of the sub-beam, as exemplified above, while keeping the pulse energy approximately the same as the incoming beam pulse energy, may be used advantageously in drilling a material. For example, reducing the average power provides extra cooling time between pulses.

In addition to the different types of sub-beams described above, processing unit 36 is able to tailor the overall energy profile over time of any particular sub-beam, by altering parameters of the RF input to the AOD to effectively set the energy of each pulse. For example, in the first mode, rather than sharply changing the energies of sub-beam pulses by a sharp change of A1, the processing unit may configure the energies to linearly decrease over a number of pulses. Such a ramped linear decrease may be used to prevent unwanted removal of a metal such as copper from a substrate layer.

Consideration of the description above of the operation of AOD 28 shows that apparatus 20 provides a system wherein the number of laser sub-beams 29 being utilized simultaneously at any given time can be varied by processing unit 36. In addition, processing unit 36 is able to select the fraction of pulse energy in each sub-beam 29, to tailor the overall energy profile with time of each sub-beam, and to set the pulse frequency of each sub-beam 29 to be the same as the pulse frequency of input beam 24 or to be a sub-multiple of the pulse frequency of the beam.

The following description provides different examples that illustrate how apparatus 20 may apply the variable number of sub-beams, the different possible energies of the pulses in each of the sub-beams, and the different characteristics of the sub-beams, to efficiently drill different substrates. As is illustrated, the variable number, and different energies and characteristics enable the time taken to drill different substrates to be minimized. The description assumes that processing unit 36 may generate any single sub-beam with a maximum sub-beam pulse energy $E_m$, and that the processing unit may generate multiple sub-beams, each of the sub-beams having a pulse energy less than $E_m$.

While the descriptions below use, by way of example, a three layer substrate, it will be appreciated that the descriptions may be applied, mutatis mutandis, to drilling or machining substrates having two layers, or any other number of layers.

FIGS. 3A-3I are schematic illustrations of different stages in a time progression of drilling a substrate 44A, according to an embodiment of the present invention. FIGS. 3A-3I are schematic cross-sections of substrate 44A, FIG. 3A corresponding to an initial time of the progression, FIG. 3I corresponding to a final time. The substrate is assumed to have an upper first layer 102 that is relatively difficult to drill, a second layer 104 that is easier to drill, and a third layer 106 that is not to be drilled into. It is assumed that four substantially similar holes 110, 112, 114, 116, i.e., holes having equal diameters, are to be drilled into the substrate. However two holes 114, 116, are assumed to have a lower bound of the holes, at an upper surface 108 of layer 104, finished in a first process. The other two holes 110, 112, are assumed to have their lower bound finished using a second, different, process.

By way of example, the four holes 110, 112, 114, 116 are assumed to be drilled by four separate sub-beams 41A, 41B, 41C, and 41D, respectively reflected from mirrors 38A, 38B, 38C, and 38D. As described above, sub-beams 41A, 41B, 41C, and 41D, are respectively formed from sub-beams 29A, 29B, 29C, and 29D.

Figure 3A:
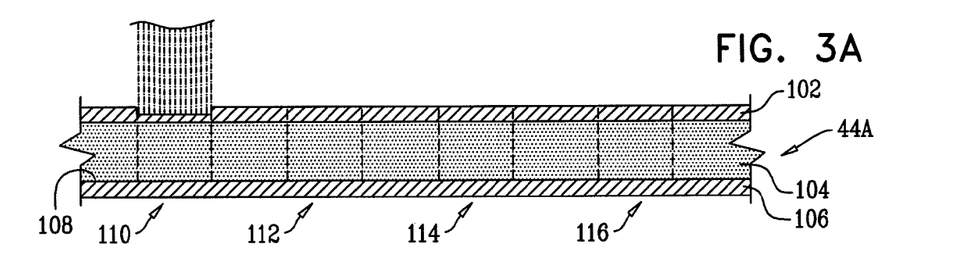
Figure 3B:
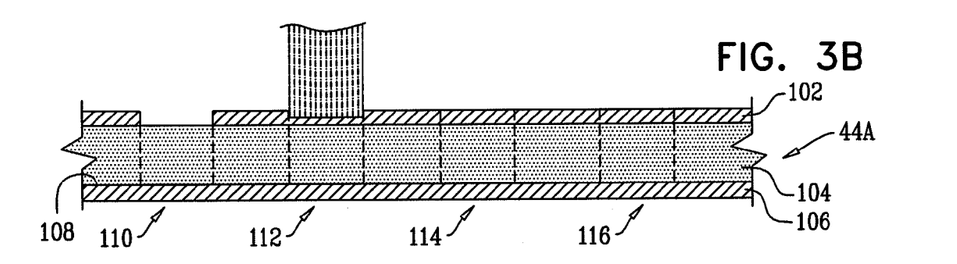
Figure 3C:
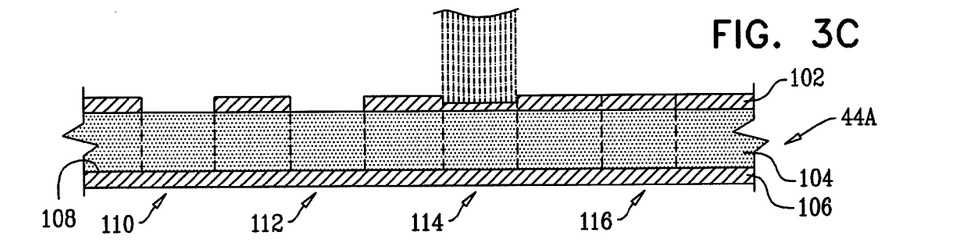
Figure 3D:
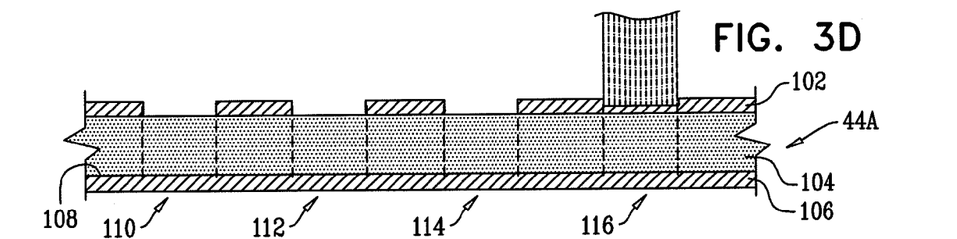
Figure 3E:
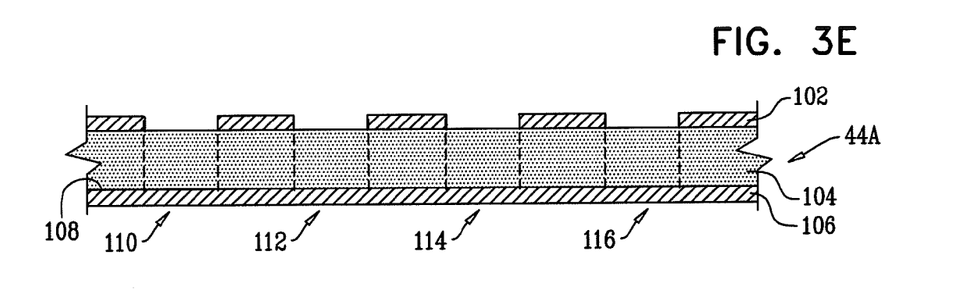

Because layer 102 is difficult to drill, processing unit 36 initially drills layer 102 using one sub-beam at a time. Each sub-beam has a pulse energy $E_m$. By way of example it is assumed that each sub-beam is generated by operating AOD 28 in its first mode (FIG. 2A), and sequentially applying a different frequency F1, F2, F3, F4 to the AOD. The different frequencies sequentially generate sub-beams 29A, 29B, 29C, then 29D, which respectively form sub-beams 41A, 41B, 41C, and 41D. Processing unit 36 sequentially applies sub-beams 41A, 41B, 41C, and 41D, respectively reflected from mirrors 38A, 38B, 38C, and 38D, to drill the respective sections of layer 102 of holes 110, 112, 114, and 116. As shown in FIG. 3A layer 102 of hole 110 is first drilled. Then, as shown in FIGS. 3B, 3C, and 3D, layer 102 of holes 112, 114, and 116 are drilled sequentially, each with a sub-beam having a pulse energy $E_m$. FIG. 3E illustrates the state of substrate 44A after layer 102 has been drilled for all four holes.

Figure 3F:
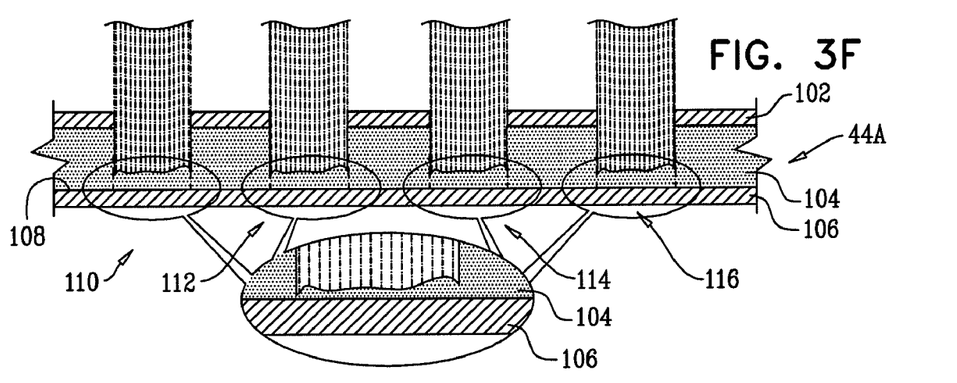

Because layer 104 is easier to drill, and because the layer has been made accessible for drilling for all four holes, processing unit 36 simultaneously operates the same four sub-beams 41A, 41B, 41C, and 41D as were used to drill layer 102, as shown in FIG. 3F. The four sub-beams are assumed to use substantially equal fractions $$\frac{1}{4} E_{available}$$

of an available total sub-beam energy $E_{available}$. The four sub-beams are formed simultaneously by the processing unit operating AOD 28 in the second mode (FIG. 2B), providing an RF input with combined frequencies F1, F2, F3, F4, each frequency having a respective amplitude A1, A2, A3, and A4, to the AOD.

The amplitudes A1, A2, A3, and A4 are selected so that the pulse energies of each sub-beam are approximately the same, although, because of the different characteristics of the second mode compared to the first mode explained above, it will be understood that $E_{available}$ is typically less than $E_m$. The four sub-beams use mirrors 38A, 38B, 38C, and 38D to drill layer 104, and drilling with the four sub-beams continues until a hole of layer 104 of the appropriate depth required has been drilled by all four sub-beams.

Figure 3G:
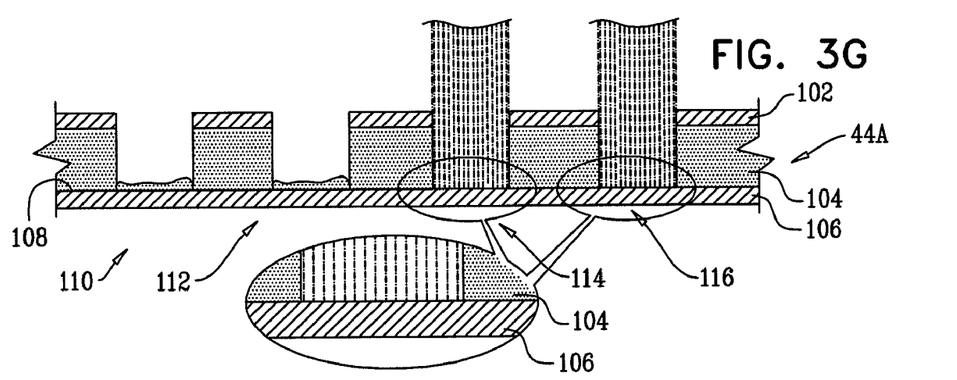

In subsequent drilling of the holes illustrated by FIG. 3G, processing unit 36 operates sub-beams 41C, 41D with approximately equal fractional pulse energies $E_f$ greater than $$\frac{1}{4} E_{available},$$

for holes 114 and 116, by operating AOD 28 in the second or third mode. The drilling of holes 114 and 116 continues until upper surface 108 of the holes has been reached. At this point, by way of example, the drilling of holes 114 and 116 are given a final finish. The finish is assumed, to be, by way of example, by ramping the energies of the two sub-beams down from $E_f$ to 0. As the energies of the two sub-beams for holes 114 and 116 are being ramped down, processing unit 36 may ramp the pulse energies of sub-beams 41A, 41B for holes 110 and 112 up from 0 to $E_f$, so as to start drilling holes 110 and 112. The ramping down and ramping up is implemented by the processing unit providing an appropriate RF input to AOD 28, as described above.

Figure 3H:
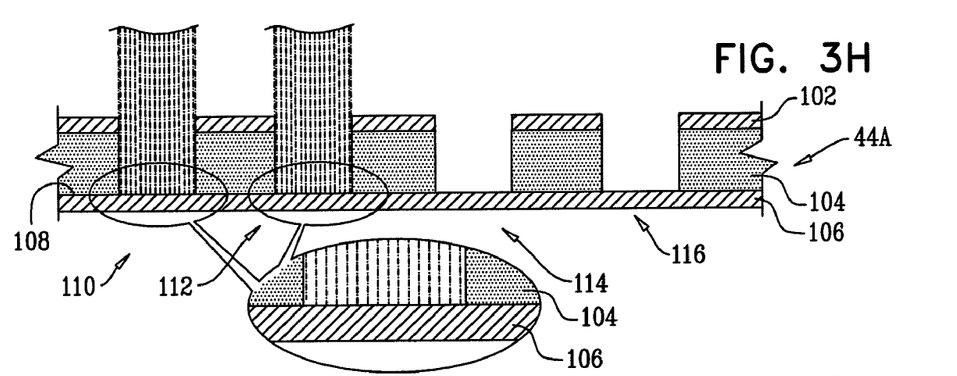
Figure 3I:
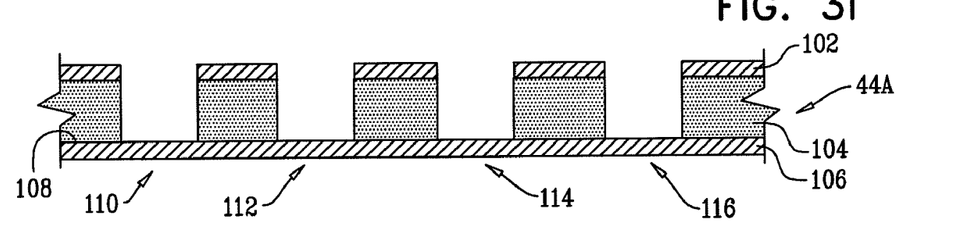

The processing unit continues drilling holes 110 and 112 with pulse energies of $E_f$, until surface 108 is reached, as illustrated by FIG. 3H. By way of example, processing unit 36 is assumed to maintain the pulse energies at $E_f$ until surface 108 has been finished as required, at which point the processing unit terminates drilling of holes 110 and 112. The completed holes are illustrated in FIG. 3I.

FIGS. 4A-4I are schematic illustrations of different stages in a time progression of drilling a substrate 44B, according to an embodiment of the present invention. FIGS. 4A-4I are schematic cross-sections of substrate 44B, FIG. 4A corresponding to an initial time, FIG. 4I corresponding to a final time.

Substrate 44B is assumed to have an upper first layer 202 that is relatively difficult to drill, a second layer 204 that is easier to drill, and a third layer 206 that is not to be drilled into. It is assumed that eight holes 209, 210, 212, 214, 216, 218, 220, and 222 are to be drilled into the substrate. By way of example, holes 212, 214, 216, 218, 220, and 222 are assumed to have the same diameter D1, and holes 209, 210 are assumed to have equal diameters D2, larger than D1.

By way of example, the eight holes 209, 210, 212, 214, 216, 218, 220, and 222 are assumed to be drilled by eight separate sub-beams 41A, 41B, 41C, 41D, 41E, 41F, 41G and 41H, respectively reflected from mirrors 38A, 38B, 38C, 38D, 38E, 38F, 38G and 38H. Sub-beams 41A, ... 41H are respectively formed from sub-beams 29A, ... 29H.

Figure 4A:
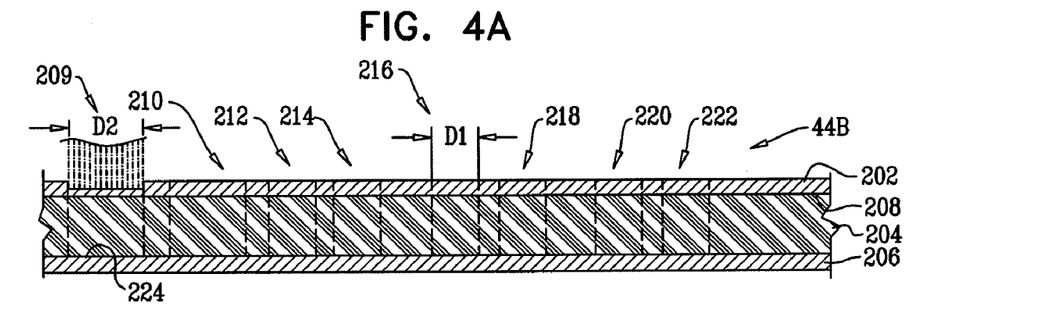

As shown in FIG. 4A, processing unit 36 initially drills hole 209 using one sub-beam 41A, with a pulse energy $E_1$ and a diameter D2. Mirror 38A directs the sub-beam. The drilling through layer 202 continues until an upper surface 208 of layer 204 is reached, at which point the processing unit stops drilling hole 209.

Figure 4B:
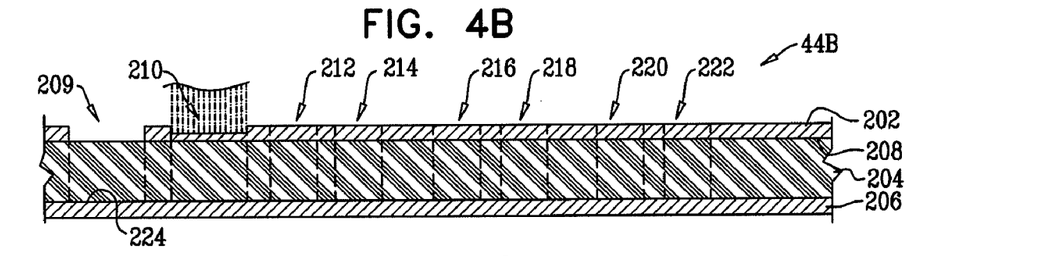

As shown in FIG. 4B, unit 36 then drills hole 210 using one sub-beam 41B, with a pulse energy $E_1$ and a diameter D2, and mirror 38B directs the sub-beam. The drilling continues until upper surface 208 is reached, at which point the processing unit stops drilling hole 210, and starts drilling holes 212 and 214.

Figure 4C:
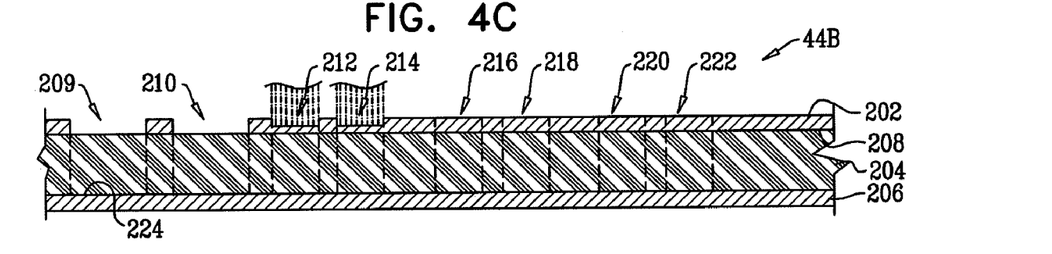

Because of their smaller diameter, processing unit 36 drills holes 212 and 214 simultaneously, as shown in FIG. 4C. In order to drill the holes, the processing unit generates two sub-beams 41C, 41D, each with an equal pulse energy $E_2$ and diameter D1. $E_2$ is a fraction of $E_1$. Unit 36 uses two mirrors 38C and 38D to direct the sub-beams to the different holes. The processing unit typically generates the two sub-beams using the second mode of operation of AOD 28, so that the pulse rate of the sub-beams is the same as the pulse rate of beam 24.

Alternatively, the two sub-beams may be generated by one or more other methods described above with reference to AOD 28. For example, the processing unit may operate AOD 28 in the first mode, and alternate between two different input frequencies. In this case the two sub-beams 41C and 41D may each have equal pulse energies, but a pulse repetition rate $$\frac{1}{2} \text{ of that of beam 24.}$$

The drilling of holes 212 and 214 continues until surface 208 is reached for each of the holes.

Figure 4D:
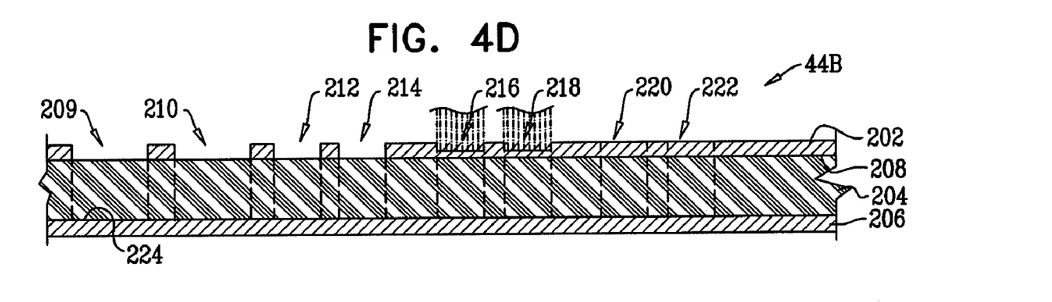

When surface 208 is reached for holes 212 and 214, the processing unit stops drilling the holes and begins drilling holes 216 and 218, as shown in FIG. 4D. To drill holes 216 and 218, processing unit 36 generates two sub-beams 41E, 41F, using two mirrors 38E, 38F, to direct the sub-beams. The method of generation of the sub-beams is typically as described above for sub-beams 41C, 41D. The drilling of holes 216 and 218 continues until surface 208 is reached for each of the holes.

Figure 4E:
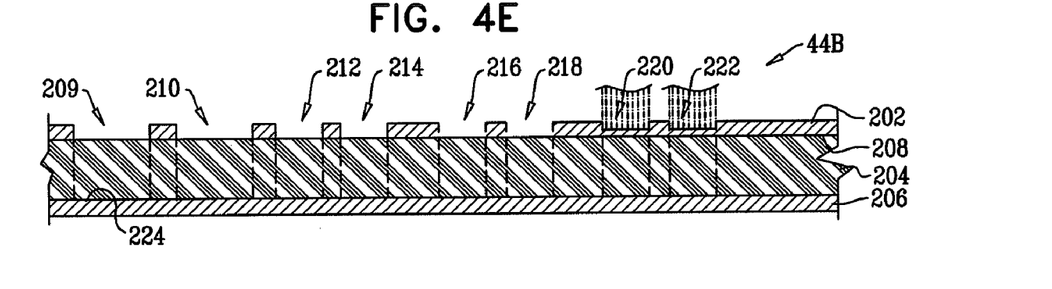

When surface 208 is reached for holes 216 and 218, the processing unit stops drilling the holes and begins drilling holes 220 and 222, as shown in FIG. 4E. To drill holes 220 and 222, processing unit 36 generates two sub-beams 41G, 41H, using two mirrors 38G, 38H, to direct the sub-beams. The method of generation of the sub-beams is typically as described above for sub-beams 41C, 41D. The drilling of holes 220 and 222 continues until surface 208 is reached for each of the holes.

At this point layer 202 has been drilled for all eight holes in substrate 44B.

Figure 4F:
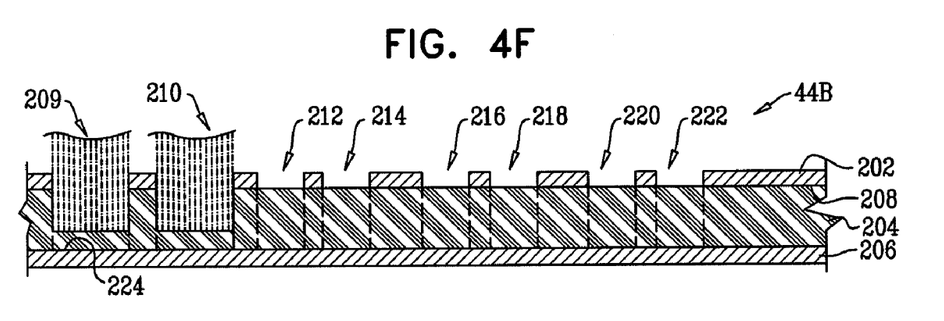

As shown in FIG. 4F, the processing unit then begins drilling holes 209 and 210 through layer 204. Because layer 204 is easier to drill than layer 202, processing unit 36 uses the two sub-beams 41A and 41B, setting the two sub-beams to have approximately equal pulse energies, less than $E_1$. The processing unit continues to drill holes 209 and 210 until reaching an upper surface 224 of layer 206, at which point the unit switches sub-beams 41A and 41B off.

Figure 4G:
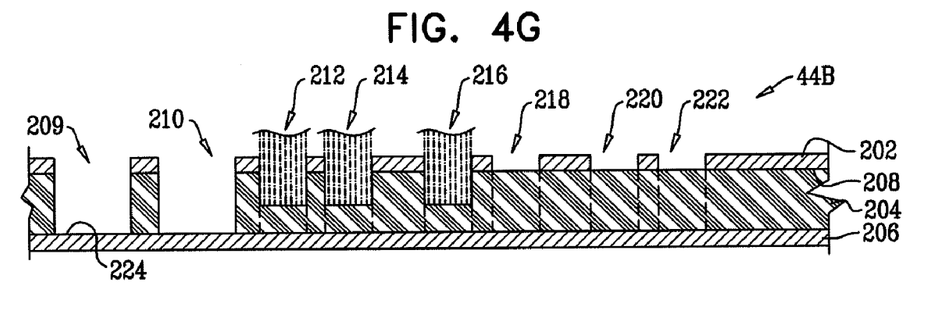

Once holes 209 and 210 have been completed, as shown in FIG. 4G, unit 36 is able to reorient mirrors 38A and/or 38B, if required, typically for future drilling of other regions of substrate 44B.

Layer 204 is easier to drill than layer 202. Consequently, rather than drilling holes 212, 214, 216, 218, 220, and 222 as three sets of simultaneous double-hole drillings, unit 36 typically drills the holes as two sets of simultaneous triplet drillings.

As shown in FIG. 4G, unit 36 first drills holes 212, 214, and 216. In order to drill the holes, the processing unit generates the three sub-beams 41C, 41D, and 41E substantially as described above, but with each sub-beam having an equal pulse energy of $E_3$, which is a fraction of $E_2$. Alternatively, the three sub-beams may be generated by one or more other methods described above with reference to AOD 28, such as by alternating between three different input frequencies. In this case the three sub-beams 41C, 41D, and 41E may each have a pulse energy approximately equal to $E_1$, but a pulse repetition rate $$\frac{1}{3} \text{ of that of beam 24.}$$

Once holes 212, 214, and 216 have been drilled, unit 36 is able to reorient mirrors 38C, 38D, and/or 38E, if required, for drilling other regions of substrate 44B.

Figure 4H:
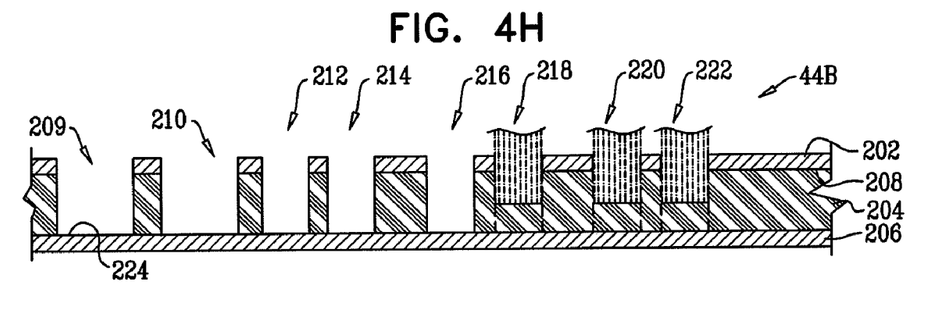

As shown in FIG. 4H, unit 36 then drills holes 218 220, and 222, in a generally similar manner to the process described above in reference to FIG. 4G, using sub-beams 41F, 41G, and 41H with appropriate parameter changes from the sub-beams used for drilling layer 202. Once the holes have been drilled, unit 36 is able to reorient mirrors 38F, 38G and/or 38H, if required, for future drilling of other regions of the substrate.

Figure 4I:
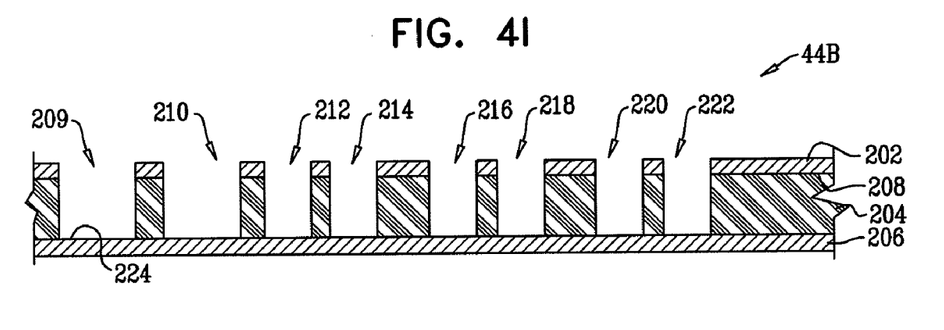

FIG. 4I shows the final state of substrate 44B, with all holes drilled.

Figure 5:
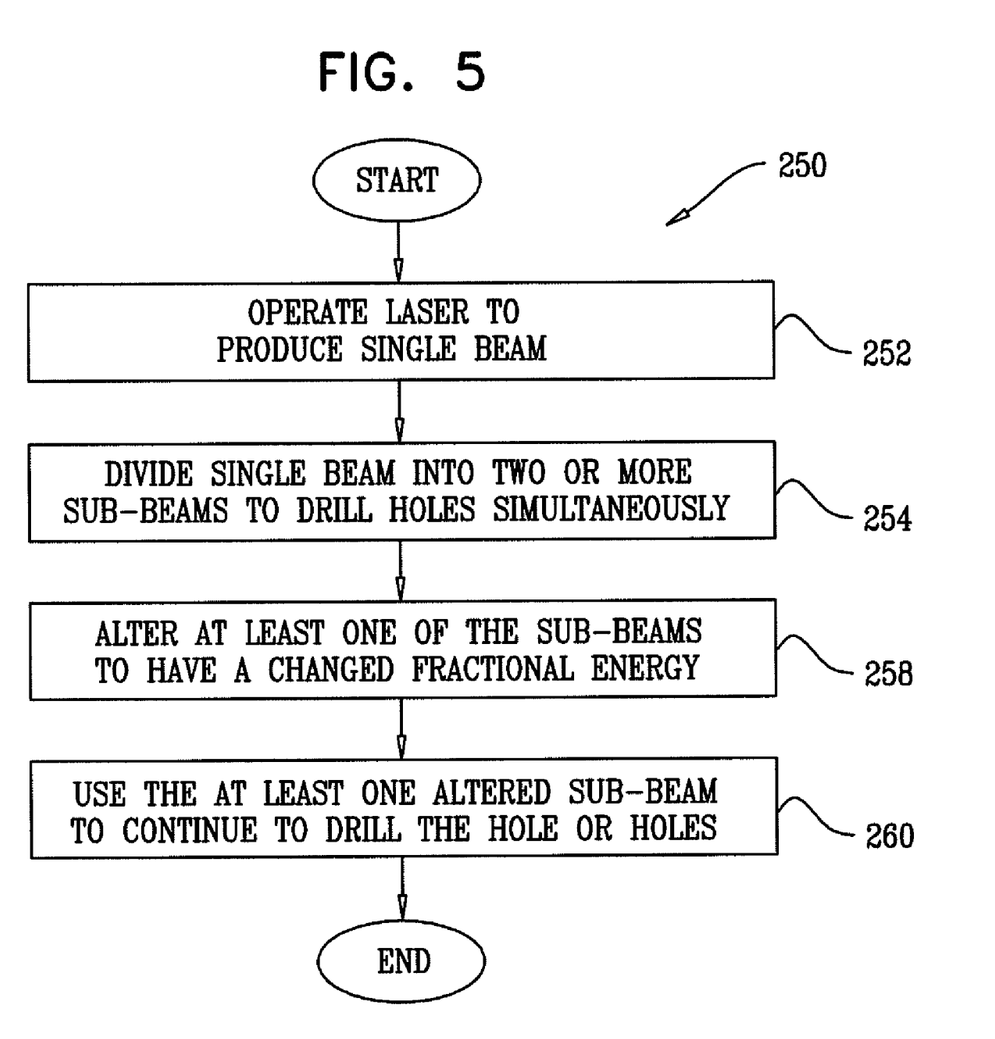
FIG. 5 is a simplified flowchart showing steps performed by a processing unit in order to drill a substrate, according to an embodiment of the present invention.

FIG. 5 is a flowchart 250 showing steps performed by processing unit 36 in order to drill substrate 44, according to an embodiment of the present invention. The steps of the flowchart correspond to the multiple hole drilling operations described above with reference to FIGS. 3A-3I and FIGS. 4A-4I.

In a beam generation step 252, unit 36 operates laser 22 to produce a single output beam 24 whose pulses have a total energy $E_t$ J, as described above with reference to FIG. 1. Typically the pulse rate is constant.

In a beam division step 254, unit 36 applies RF input to AOD 28, so as to divide the single beam into two or more sub-beams. The division of the single beam is exemplified above with reference to FIG. 3F and FIG. 4C. As described above, the division may cause the sub-beams to have fractional pulse energies, compared to the total energy $E_t$ of beam 24.

In a first drilling step 256, unit 36 orients the mirrors reflecting the sub-beams so that the sub-beams drill parts of respective multiple holes simultaneously, as is also described above with reference to FIGS. 3F and 4C.

In a sub-beam alteration step 258, the processing unit alters the sub-beams so that at least one of the altered sub-beams has a different fractional pulse energy compared to the pulse energy of step 254.

In a second drilling step 260, unit 36 applies the altered sub-beam or sub-beams to continue drilling their respective holes. The alteration in sub-beams is exemplified above, for example in the description with reference to FIG. 3G, and in the description with reference to FIG. 4G.

Typically, unit 36 repeats all or some of the steps of flowchart 250, as required, to drill all the holes of a given substrate.

It be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for laser drilling of holes in a substrate with varying simultaneity comprising:
    operating a laser to produce a single output beam whose pulses have a total energy;
    dividing said single output beam into plural beams to an extent which varies over time; and
    applying said plural beams to plural hole drilling locations on said substrate including:
    simultaneously drilling first parts of multiple holes using corresponding ones of said plural beams having a pulse energy which is a first fraction of said total energy; and
    thereafter drilling at least one second part of at least one of said multiple holes using at least one of said plural beams each having a pulse energy which is at least a second fraction of said total energy, said second fraction being different from said first fraction.

2. A method according to claim 1 and wherein said first fraction is a function of the number of said multiple holes.

3. A method according to claim 1 and wherein said second fraction is a function of the number of said multiple holes having said at least one second part being drilled.

4. A method for laser drilling of holes in a substrate with varying simultaneity comprising:
    operating a laser to produce a single output beam having a total power;
    dividing said single output beam into plural beams to an extent which varies over time; and
    applying said plural beams to plural hole drilling locations on said substrate including:
    simultaneously drilling first parts of multiple holes using corresponding ones of said plural beams having a beam power which is a first fraction of said total power; and
    thereafter drilling at least one second part of at least one of said multiple holes using at least one of said plural beams each having a beam power which is at least a second fraction of said total power, said second fraction being different from said first fraction.

5. A method according to claim 4 and wherein said first fraction is a function of the number of said multiple holes.

6. A method according to claim 4 and wherein said second fraction is a function of the number of said multiple holes having said at least one second part being drilled.

7. A method according to claim 4 and wherein said single output beam comprises pulses having single beam pulse energies generated at a pulse repetition rate, and wherein said ones of said plural beams drilling first parts of multiple holes comprise pulses having said pulse repetition rate and pulse energies which are said first fraction of said single beam pulse energies.

8. A method according to claim 7 and wherein said at least one of said plural beams drilling at least one second part of at least one of said multiple holes comprise pulses having said pulse repetition rate and pulse energies which are at least said second fraction of said single beam pulse energies.

9. A method according to claim 7 and wherein said at least one of said plural beams drilling at least one second part of at least one of said multiple holes comprise pulses having a sub-multiple of said pulse repetition rate and pulse energies which are a function of said single beam pulse energies, wherein said sub-multiple and said function are selected in response to said second fraction.

10. A method according to claim 4 and wherein said single output beam comprises pulses having single beam pulse energies generated at a pulse repetition rate, and wherein said ones of said plural beams drilling first parts of multiple holes comprise pulses having a first sub-multiple of said pulse repetition rate selected in response to said first fraction and pulse energies which are a first function of said single beam pulse energies.

11. A method according to claim 10 and wherein said at least one of said plural beams drilling at least one second part of at least one of said multiple holes comprise pulses having a second sub-multiple of said pulse repetition rate and pulse energies which are a second function of said single beam pulse energies, said second sub-multiple and said second function being selected in response to said second fraction.

* * * * *